July 1, 1958

C. B. SHIELDS 2,841,745

ELECTRIC SPEED GOVERNORS

Filed Sept. 9, 1955

INVENTOR.
Charles B. Shields.
BY W. L. Stout.
HIS ATTORNEY

INVENTOR.
Charles B. Shields.
BY
W. L. Stout
HIS ATTORNEY

July 1, 1958

C. B. SHIELDS 2,841,745

ELECTRIC SPEED GOVERNORS

Filed Sept. 9, 1955

INVENTOR.
Charles B. Shields.
BY
W. L. Stout.
HIS ATTORNEY

United States Patent Office 2,841,745
Patented July 1, 1958

2,841,745

ELECTRIC SPEED GOVERNORS

Charles B. Shields, Penn Township, Allegheny County, Pa., assignor to Westinghouse Air Brake Company, Wilmerding, Pa., a corporation of Pennsylvania Application September 9, 1955, Serial No. 533,400

18 Claims. (Cl. 317—5)

My invention relates to electric speed governors suitable for use in automatic train control, and particularly to an electric speed governor supplied with coded energy for providing fail-safe governor operation.

Previous speed governors, suitable for use in automatic train control, have usually been of the centrifugal type and of heavy construction to withstand being mounted at the end of a train axle. The centrifugal type governors are normally provided with a plurality of contacts which are normally closed and which open sequentially as the train speed increases. This type of governor is expensive to manufacture and is of necessity relatively large in size and heavy in weight, making it difficult to mount on the end of a vehicle axle. Furthermore, due to the fact that it is normally mounted at the end of a vehicle axle it is subject to excessive vibration.

It is therefore an object of my invention to provide a novel speed governor, suitable for use in automatic train control, that is inexpensive to manufacture and accurate in operation.

Another object of my invention is to provide a novel speed governor that is capable of having most of its equipment located remote from the axle of the vehicle making the portion associated with the axle light in weight and small in size.

Other objects, purposes and characteristic features of my invention will be in part obvious from the accompanying drawings and in part pointed out as the description of my invention progresses.

One preferred embodiment of my invention, suitable for use in automatic train control, comprises a magnetic circuit constructed of soft laminated iron and provided with an air gap spanned by a permanent magnet capable of rotation by an axle of an associated vehicle. Coupled to the laminated iron of the magnetic circuit is a pair of windings. The first winding is connected to a source of varying or alternating voltage, while the second winding is inductively coupled to the first winding and to the magnetic circuit for receiving any flux change produced in the magnetic circuit by the first winding voltage or the rotating permanent magnet. The second winding is connected through an amplifier to a plurality of filters capable of passing frequencies above an established lower limit with each filter having a different lower limit. Connected to each filter is a relay capable of responding to the output of its particular filter. The relay connected to the filter having the highest established lower limit is provided with a back contact for applying the alternating voltage source to the first winding when the relay is deenergized and its back contact is closed, and removing the alternating voltage from the first winding when the relay is energized and its back contact is open. The frequency of the alternating voltage is so chosen that it is above the established filter lower limits, and it can be seen, therefore, that a self coding operation is established. Each of the relays will then follow the coded energy supplied by the alternating voltage source.

Rotation of the permanent magnet in response to vehicle axle rotation causes a flux in the magnetic circuit of a frequency proportional to the speed of the magnets rotation. The permanent magnet flux develops a voltage in the second winding proportional to the flux frequency which is then applied to each of the filters. As the vehicle speed increases and the voltage frequency in the second winding due to the magnet increases above the lower limit of each filter, the relay associated with such filter will become steadily energized and will hold its armature steadily attracted closing its front contact. Since the filters are designed to have different lower limits it can be seen that the relays will be steadily energized and pick up their armatures at different rotating magnet developed frequency levels.

I shall describe several forms of speed governors embodying my invention, and shall then point out the novel features thereof in claims.

In the accompanying drawings.

Similar reference characters refer to similar parts in each of the several views.

Figure 1:
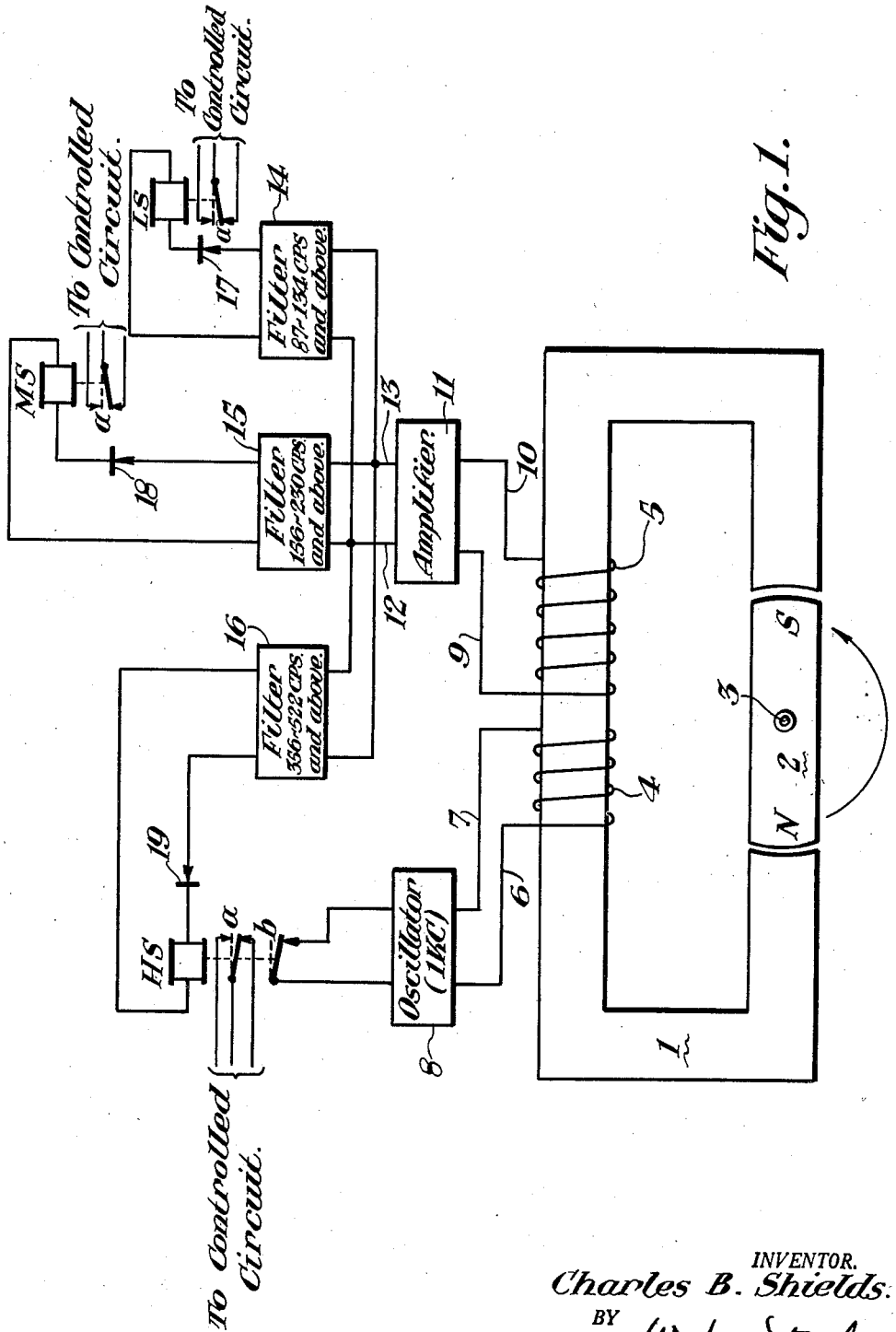
Fig. 1 is a diagrammatic view showing one form of electric speed governor embodying my invention.

Referring to the embodiment of my invention shown in Fig. 1, the numeral 1 generally designates a core member constructed of soft laminated iron and forming a substantially closed loop with a rotative permanent magnet 2 which is supported on and rotates with a center shaft 3 when the shaft is connected to a rotating member such as a vehicle axle (not shown). Mounted on the core member 1, on a portion opposite the rotating permanent magnet, are a pair of windings 4 and 5. The winding 4 is connected through lead wires 6 and 7 to an alternating current source 8. As here illustrated, this current source is an oscillator shown in block form since it forms no part of my present invention, however the current source can be of any rising and falling wave form capable of energy transfer through transformer action. The alternating current source 8 may have any suitable frequency, and is controlled over a back contact $b$ of a relay HS to maintain current output as long as the back contact $b$ is closed. A frequency which has been found to be suitable is one kilocycle as indicated on the block diagram. Operation of relay HS will be explained hereinafter. For present purposes it is sufficient to point out that the alternating current source 8 will supply current to the winding 4 as long as the back contact $b$ of the relay HS is closed and will cease to supply current to this winding when the back contact $b$ is picked up or opened.

The winding 5 surrounding the core member 1 is a receiving winding, and is connected through the lead wires 9 and 10 to an amplifier 11. The amplifier 11 may be of any suitable type, and is shown in block form since the details of construction form no part of my invention. The output leads 12 and 13 of the amplifier 11 are connected to a plurality of filters 14, 15 and 16 which are connected in parallel. The filters 14, 15 and 16 are capable of passing frequencies above predetermined lower limits, and are generally referred to in the art as high-pass filters. The high-pass filters 14, 15 and 16 are also shown in block form since they may have any suitable construction. The high-pass filters 14, 15 and 16 are constructed to have different lower level frequencies, and are connected through the associated rectifiers 17, 18 and 19, respectively, to the code following relays LS, MS and HS, respectively.

Typical values for the high-pass filter responses may be as follows:

Filter 14 may be tuned, for example, to pass all frequencies above those corresponding to a vehicle speed of 20 miles per hour, which for the usual wheel sizes, would be in the range of 87 to 134 cycles.

Filter 15 would be tuned to pass all frequencies above those corresponding to a somewhat higher vehicle speed, for example, 35 miles per hour, and the typical frequency response would be 156 cycles to 230 cycles.

Filter 16 would be tuned to pass all frequencies above those corresponding to the maximum speed desired, for example, 80 miles per hour, and this would require a low level frequency of 356 cycles to 522 cycles depending upon wheel size.

The relay HS which responds to the output of filter 16 is provided with two movable contacts. The first contact, generally designated as a, is movable between a back contact position and a front contact position, and is used for controlling any desired circuit or decoding of relay (not shown). The second movable contact, generally designated as b, cooperates with a back contact and is used to control the application of the alternating current energy to winding 4, as explained hereinafter. With the contact b closed, the alternating current source 8 is energized and capable of delivering its energy to the winding 4. As soon as the relay HS becomes energized however, the contact b is opened and the alternating source 8 ceases to deliver energy to the winding 4. The relays MS and LS are each provided with front and back contacts for controlling a circuit or decoding relay (not shown) as desired.

Operation of the speed governor shown in Fig. 1 will now be explained in detail. Under steady state conditions with the member to which the permanent magnet 2 is connected not rotating, the alternating current source 8 delivers a constant frequency voltage to the winding 4 which causes a flux to be induced in the core member 1. The flux induced in the core member 1 induces a voltage in the receiver winding 5 which is amplified by the amplifier 11 and applied to each of the filters 14, 15 and 16 through the conductors 12 and 13. Since the frequency of the applied voltage will be above each filter lower limit, which for example, may fall within the typical values given hereinbefore and indicated as having an upper low frequency response limit of 522 cycles, each of the relays LS, MS and HS will become energized, causing each relay to open its respective back contact a, and the relay HS in addition, to open its contact b. The opening of the contact b of the relay HS causes the constant frequency voltage to be removed from the winding 4, and the relays LS, MS and HS therefore become deenergized, and close their back contacts. As soon as contact b closes the constant frequency voltage is reapplied to winding 4 and the cycle is repeated. Thus a self-coding operation is established.

Let us assume now that the permanent magnet 2 is being rotated. This rotation produces an alternating flux in the core member 1 independent of the flux produced by the current supplied to the winding 4 from the alternating current source 8, and hence induces an uninterrupted or non-coded voltage in the winding 5. This voltage is amplified by the amplifier 11 and applied to each of the filters 14, 15 and 16. If the voltage developed in the winding 5 is of a frequency less than the lower limit of any of the filters 14, 15 and 16 the relays will continue to follow the coded voltage developed in the winding 5 by the alternating current source 8. When the winding 5 voltage induced by the permanent magnet 2 has a frequency above the lower limit of the filter 14, this filter will allow the energy to pass through the filter and will thus maintain the relay LS steadily energized and close its front contact. As long as the frequency of the flux produced by the movable magnet 2 in the core member 1 develops a voltage in the winding 5 of a frequency less than the lower limit of the filters 15 and 16, this voltage cannot pass through these two filters, and the relays MS and HS therefore, continue to follow the coded frequency supplied by the alternating current source 8. If the speed of the movable magnet 2 is increased to a velocity capable of producing a flux in the core member 1, and thus a voltage in the receiver winding 5, of a frequency higher than the lower limit of the high-pass filter 15, but below the lower limit of the high-pass filter 16, it can be seen that the voltage will pass through the filters 14 and 15 and the relays LS and MS will be maintained steadily energized. The filter 16, however has a frequency response, the lower limit of which is above the frequency of the voltage produced in the winding 5 by the movable magnet 2, and the relay HS will therefore continue to follow the coded energy supplied by the alternating current source 8. A still further increase in the rate of rotation of the magnet 2 causes the voltage induced in the winding 5 to rise to a frequency above the lower limit of the high-pass filter 16 which, in turn, causes energy to pass through all of the filters thus causing all of the relays LS, MS and HS to be maintained steadily energized. All of the relays will therefore hold their back contacts open and their front contacts closed. Under these conditions, it can be seen that the alternating current energy from the source 8 is removed from the winding 4 by the opening of contact b of the relay HS. This condition will continue to exist as long as the speed of the movable magnet 2 is maintained sufficiently high to produce a voltage in the receiver winding 5 of a frequency greater than the lower limit of the high-pass filter 16.

In reducing the speed of the movable magnet 2, the reverse operation to the increase in speed occurs in my novel speed governor. That is, as the frequency of the voltage produced in the winding 5, due to the flux induced in the core 1 in response to the moving magnet 2, falls below the lower limit of the high-pass filter 16, the relay HS again becomes deenergized causing the alternating current source 8 to become active and supply energy to the winding 4, winding 5, amplifier 11 and filter 16, reestablishing the self-coding operation. As the speed of the movable magnet 2 continues to decrease and the frequency of the voltage in the winding 5 falls below the lower limit of the filter 15, it can be seen that the only energy which will be supplied to the relay MS will be in the coded alternating current 8 energy induced in the winding 5. A still further reduction in the speed of the movable magnet 2 to a point in which the frequency of the voltage supplied by the winding 5, due to the moving magnet 2, falls below the lower limit of the frequency response of the filter 14, will cause the only energy supplied to the relay LS to be the coded alternating current 8 energy produced in winding 5.

It is to be understood that the frequencies selected for the filters 14, 15 and 16 are typical frequencies chosen for a typical application to a rail vehicle in which the response speeds selected were 20, 35 and 80 miles per hour, respectively. It is to be further understood, that any frequencies may be used in accordance with the particular selected speeds desired and also the size of the vehicle wheel upon which the device is used. It is therefore understood that my invention is not to be limited to the specific frequencies or speeds recited.

Figure 2:
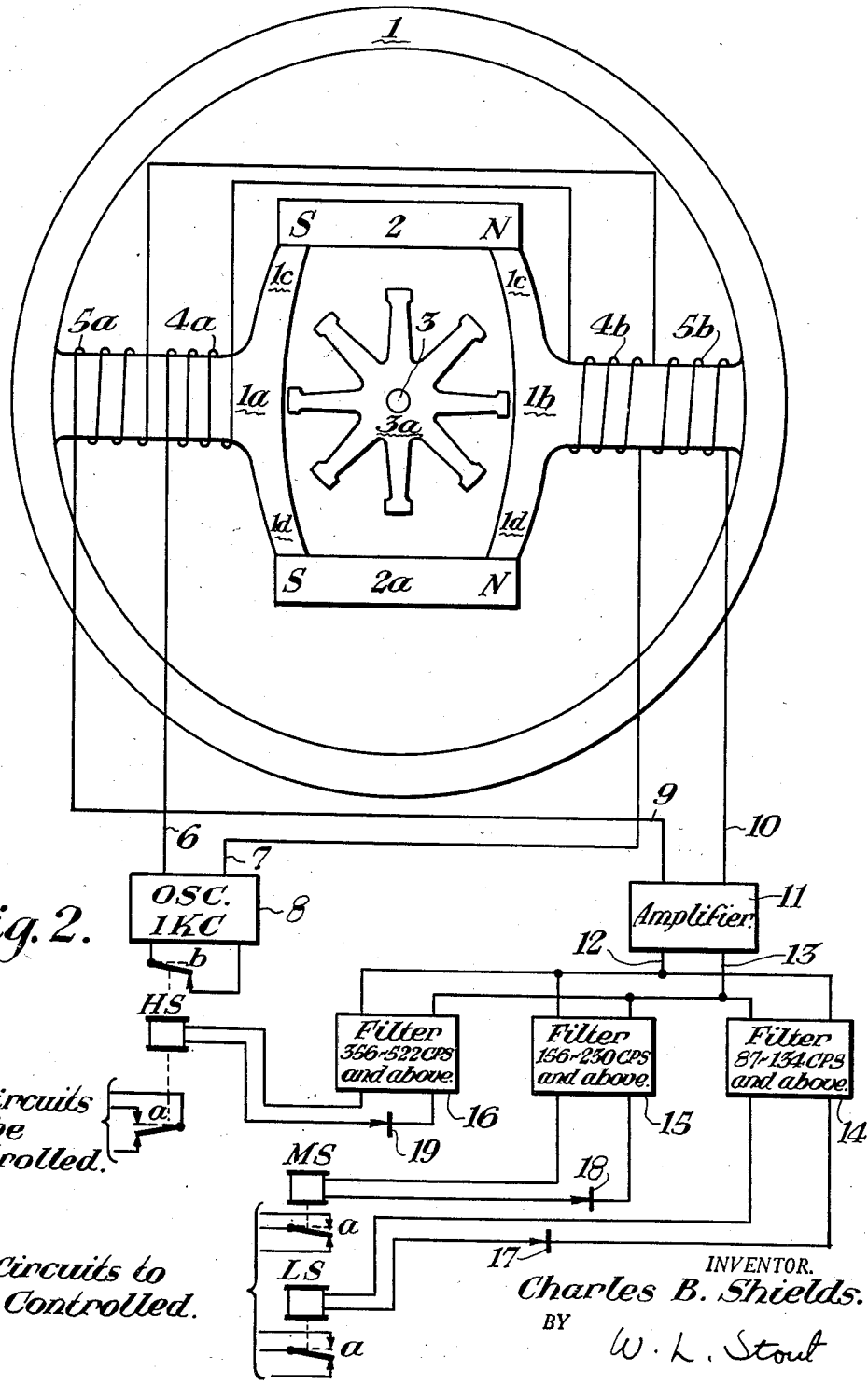
Fig. 2 is a diagrammatic view showing a modified form of electric speed governor embodying my invention.

The embodiment of my invention as shown in Fig. 2 comprises a magnetic path including a core member or shell 1, a pair of opposite pole pieces 1a and 1b secured to said core member 1, a movable member 3a and a pair of magnets 2 and 2a. The pole pieces 1a and 1b are provided with pole piece extensions 1c and 1d. The extensions 1c are spanned by the permanent magnet 2 and the extensions 1d are spanned by the permanent magnet 2a. The permanent magnets 2 and 2a are so positioned that the ends having "like" polarities are secured to the pole piece extensions on the same pole piece. Pivotally supported between the pole pieces 1a and 1b on a pivot shaft 3 is a spider shaped movable member 3 of soft magnetic material provided with a plurality of radial fingers having a diameter equal to substantially the full distance between the central portions of the faces of the pole pieces 1a and 1b. The spider shaft 3 is connected to the axle of a vehicle (not shown) and rotates at a velocity proportional to the vehicle speed.

The electrical circuit for Fig. 2 is identical with that shown in Fig. 1 with the exception that in Fig. 2 the winding, which is energized from the alternating source 8, is divided into two portions 4a and 4b mounted respectively on the pole pieces 1a and 1b. The receiver winding is also divided into two portions 5a and 5b which are mounted on the two pole pieces 1a and 1b, respectively. It should be pointed out however, that the windings 4a and 4b are connected in series and add their outputs to give the same result obtained by the single winding 4 on the core member 1 of Fig. 1. The receiver winding portions 5a and 5b are also connected in series and are so proportioned that the sums of the voltages induced in these portions will be approximately the same as the corresponding voltages induced in the winding 5 shown in Fig. 1.

The operation of the structure shown in Fig. 2 when the spider member 3a is at a standstill (as would occur when the member to which the spider is attached is at a standstill) is exactly the same as that described hereinbefore in connection with Fig. 1. That is, the alternating current source 8 supplies the winding portions 4a and 4b with energy which induces a flux in the magnetic circuit that is picked up by the receiver winding portions, amplified, filtered, and used to energize the relays LS, MS and HS. Each energization of the relay HS deenergizes the winding portions 4a and 4b which, in turn, causes the relays LS, MS and HS to again become deenergized. When the relay HS closes its contact b, current is again supplied to the winding portions 4a and 4b and the self-coding cycle is repeated.

When the spider 3a is moved or rotated it can be seen that a magnetic path, in addition to the magnetic core 1 path, is formed through the spider for the permanent magnets 2 and 2a. This path is intermittently of low and high reluctance when the spider fingers, separated by air spaces, pass in close proximity to each of the pole faces of the pole pieces 1a and 1b. It follows therefore that as the spider is rotated the amount of flux carried through the pole pieces 1a and 1b, and winding portions 5a and 5b will rise and fall in direct proportion to the speed of movement of the spider 3a. The spider movement causes a rising and falling flux to be established in the pole pieces 1a and 1b which causes an alternating voltage to be induced into the winding portions 5a and 5b. Operation of the circuit is exactly the same as that described in connection with Fig. 1 with the only difference being in the structure of the magnetic circuit as explained hereinbefore.

Figure 3:
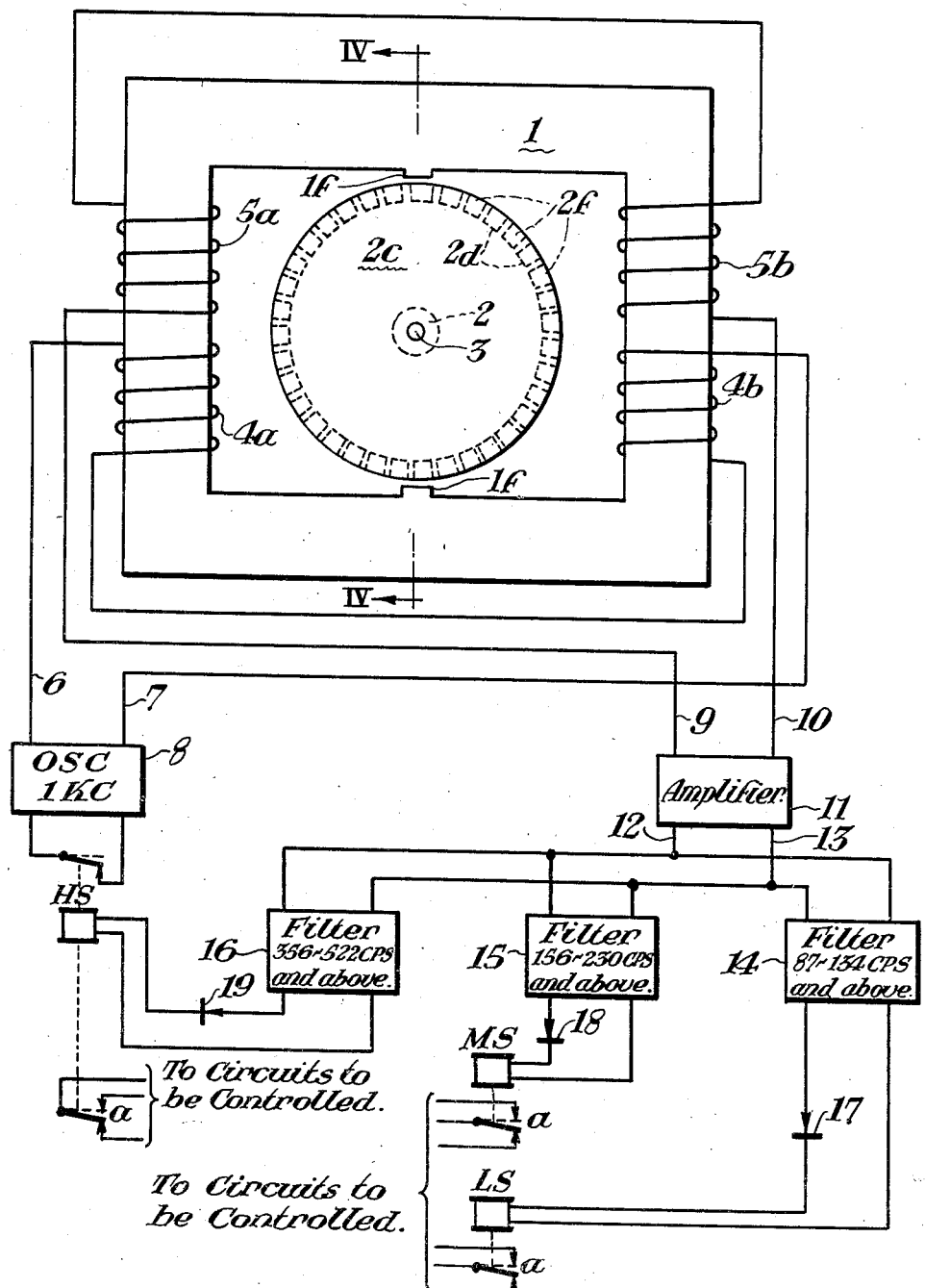
Fig. 3 is a diagrammatic view showing another form of electric speed governor embodying my invention.
Figure 4:
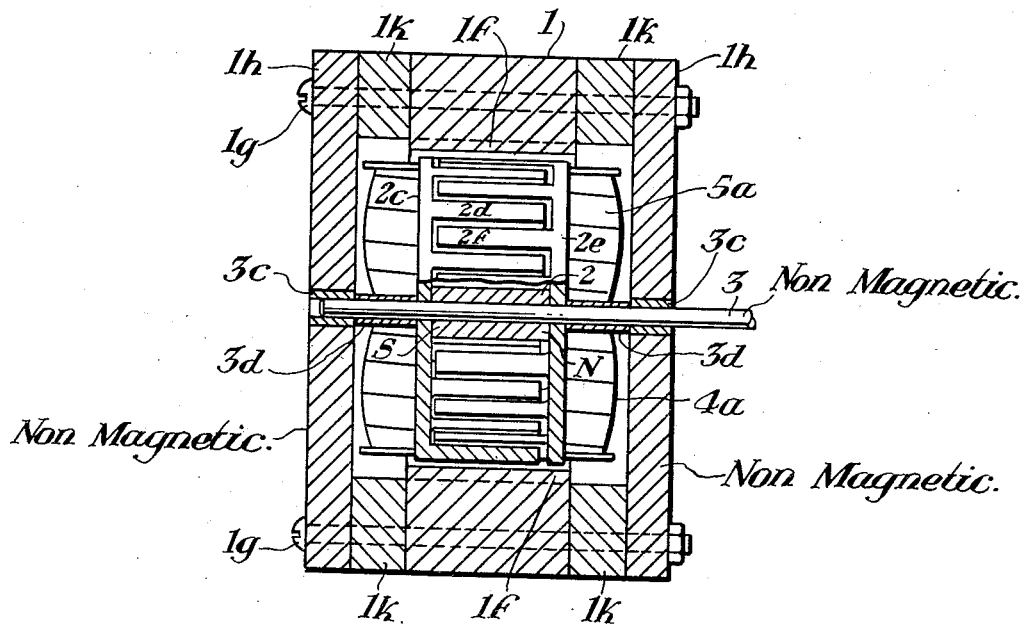
Fig. 4 is a vertical partially sectioned view of the magnetic circuit disclosed in the embodiment shown in Fig. 3 taken along the line IV—IV of Fig. 3.

Figs. 3 and 4 disclose another embodiment of my invention. The magnetic structure comprises a closed rectangular core member 1 provided with inwardly projecting magnetic ridges 1f for cooperation with a rotative permanent magnet 2 and its cooperating structure. The rotative magnet 2 is connected to a vehicle axle (not shown) and its velocity is proportional to the vehicle speed. The core member 1 forms a complete rectangular closed magnetic circuit having two pairs of windings or two pairs of winding portions 4a, 4b and 5a, 5b, surrounding two of the opposite legs of the closed core member 1. The windings 4a and 4b are on different legs of the core member 1 and are connected in series so that the energy supplied to them by the alternating current source 8 through the conductors 6 and 7 will induce a flux in the core member 1 of a value substantially equal to the flux induced by the energy in the winding 4 of Fig. 1. The windings 5a and 5b are also placed on different legs of the core member 1, and are connected in series so that the sum of the voltages induced in the windings is substantially the same as the induced voltage of the winding 4 of Fig. 1. The voltages developed in the receiver windings are supplied through the conductors 9 and 10 to the amplifier 11, similar to Fig. 1. The remainder of the circuit shown in Fig. 3 is identical to the circuit of Fig. 2 and thus will not be discussed in detail.

The rotating member of the magnetic circuit shown in Figs. 3 and 4 however, is different from the species shown in Figs. 1 and 2, and will now be described in detail.

The rotating structure of Figs. 3 and 4 comprises a non-magnetic shaft 3 located within the bearings 3c for free rotation and having secured longitudinally thereof a permanent magnet 2 positioned between two disc members 2c and 2e. The disc members 2c and 2e are provided with spaced apart fingers 2d and 2f, respectively, positioned along the respective disc peripheries and of sufficient length to overlap. The fingers 2d and 2f are parallel to the shaft 3 and so positioned or interlaid that adjacent fingers are attached to different discs, 2c or 2e. With the parts assembled on the shaft 3, and with the ends of the permanent magnet 2 engaging the disc members 2c and 2e, the fingers of one disc will become opposite in polarity with respect to the fingers of the other disc.

It can be seen by Fig. 3 that rotation of the fingers 2d and 2f about the shaft 3 and past the magnetic ridges 1f on the core member 1, will cause an induced rising and falling flux in the core member 1. This flux divides approximately equally and passes through both portions of the core member 1 located on each side of the ridges 1f. Since the induced flux would necessarily pass through the windings 5a and 5b connected in series, a voltage is induced in the windings proportional to the speed of rotation of the rotative magnet 2.

The shaft 3 and its support bushings 3c are supported in position on the core member 1 by the non-magnetic end plates 1h which are spaced from the core member 1 by the spacers 1k. The spacers 1k provide a space for the windings 4a, 4b, 5a and 5b with the structure being shown in detail in Fig. 4. The end support plates 1h are secured to the core member 1 by suitable bolts 1g and the rotative permanent magnet 2 structure is centered between the end support plates 1h by the sleeve members 3d located about the shaft 3.

Since operation of the circuit shown in Fig. 3 is identical with the circuit of Figs. 1 and 2, a description of the operation will not be repeated.

Although I have herein shown and described only a few forms of speed governor embodying my invention it is to be understood that various changes and modifications may be made therein within the scope of the appended claims without departing from the spirit and scope of my invention.

Having thus described my invention, what I claim is:

1. A control device comprising a magnetic circuit including a stationary portion and a magnetized movable portion, means for at times moving said movable portion at different rates, a first and a second winding coupled to said magnetic circuit, a source of coded varying current connected to said first winding a relay connected to said second winding to respond to a voltage developed in said second winding by the current supplied to said first winding until said movable portion moves at a rate which varies the magnetic circuit flux developed by said magnetized portion a sufficient amount to provide a second winding voltage capable of maintaining said relay steadily energized.

2. A control device comprising a magnetic circuit including a stationary portion and a movable portion, means for at times moving said movable portion at different rates, a magnetized portion associated with said magnetic circuits, a first and a second winding coupled to said magnetic circuit, a source of varying current connected to said first winding, filter means capable of passing voltages having a range of frequencies starting at a first selected frequency below and extending to a second selected frequency above the frequency of said varying current source, a relay having movable contacts, said relay being connected to said second winding through said filter means, said relay operating its movable contacts in response to the voltage developed in said second winding by said varying current source with one of said contacts periodically interrupting the supply of varying current source energy to said first winding until said movable portion reaches a velocity capable of developing a voltage in said second winding of a frequency above said first selected frequency at which time the relay becomes steadily energized.

3. A control device comprising a magnetic circuit including a stationary portion and a movable portion, means for at times moving said movable portion at different rates, a magnetized portion located within said magnetic circuit, a first winding coupled to said stationary portion, a source of coded varying current connected to said first winding, a second winding coupled to said stationary portion, a plurality of relays, a plurality of filters each having a different lower frequency limit with all lower frequency limits being below the frequency of said varying current source for allowing the passage of coded varying current energy developed in said second winding through said plurality of filters, said plurality of relays being connected through said plurality of filters to said second winding, contacts associated with each relay and capable of periodic movement between two extreme positions in response to said coded varying current energy in said second winding, said relays being steadily energized when the movable portion of said magnetic circuit increases movement causing its magnetic circuit controlled flux and its second winding developed energy frequency to pass above the different lower frequency limits of said high pass filters.

4. A control device comprising a magnetic circuit including a stationary portion and a movable portion, means for at times moving said movable portion at different rates, a magnetized portion within said magnetic circuit, a first winding coupled to said stationary portion, a source of coded varying current connected to said first winding, a second winding coupled to said stationary portion, a plurality of relays, a plurality of filters each having a different lower frequency limit with all lower frequency limits being below the frequency of said varying current source for allowing the passage of coded varying current energy developed in said second winding through said plurality of filters, said plurality of relays being connected through said plurality of filters to said second winding, contacts associated with each relay and capable of periodic movement between two extreme positions in response to said coded varying current source voltage in said second winding, said relays being steadily energized with said contact being steadily maintained in one of their said two extreme positions as the movable portion of said magnetic circuit increases movement causing its magnetic circuit developed varying flux and its second winding induced voltage frequency to pass above the different lower frequency limits of said high pass filters, and circuit means for removing said varying current from said first winding upon non-coded energization of one of said plurality of relays.

5. An electric speed governor comprising a magnetic circuit including a stationary portion and a magnetized movable portion, means for at times moving said movable portion at different rates, a first and a second winding coupled to said magnetic circuit, an oscillator connected to said first winding, means for periodically interrupting the output of said oscillator, a relay connected to said second winding and capable of following the oscillator interrupted voltage developed in said second winding until said movable portion provides a second winding voltage capable of maintaining said relay steadily energized.

6. An electric speed governor comprising a magnetic circuit including a stationary portion and a rotative permanent magnet, means for at times rotating said rotative permanent magnet at different rates, a first and a second winding coupled to said magnetic circuit, a source of coded varying current connected to said first winding, a relay connected to said second winding and having a contact capable of following the coded voltage developed in said second winding by said varying current source until the rotative permanent magnet provides a second winding voltage capable of maintaining said relay steadily energized.

7. An electric speed governor comprising a magnetic circuit including a stationary portion and a rotative permanent magnet, means for at times rotating said rotative permanent magnet at different rates, a first winding coupled to said stationary portion, a source of coded varying current connected to said first winding, a second winding coupled to said stationary portion, a plurality of relays, a plurality of filters each having a different lower frequency limit with all lower frequency limits being below the frequency of said varying current source for allowing the passage of coded varying current energy developed in said second winding through said plurality of filters, said plurality of relays being connected through said plurality of filters to said second winding, contacts associated with each relay and capable of periodic movement between two extreme positions in response to said coded varying current energy in said second winding, said relays being steadily energized with said contacts being steadily maintained in one of their said two extreme positions as the rotative permanent magnet increases its rate of rotation causing its magnetic circuit induced flux and its second winding developed energy frequency to pass above the different lower frequency limits of said high pass filters.

8. An electric speed governor comprising a magnetic circuit including a stationary portion and a rotative spider, means for at times rotating said rotative spider at different rates, said stationary portion comprising a pair of pole pieces supported on a shell of magnetic material and provided with spaced apart pole faces, a pair of permanent magnets bridging the ends of said spaced apart pole faces, first and second windings coupled to said pole pieces, a source of coded varying current connected to said first winding, a relay connected to said second winding and capable of following a coded varying voltage developed in said second winding by said source of coded varying current until said rotative spider provides a second winding voltage capable of maintaining said relay steadily energized.

9. An electric speed governor comprising a magnetic circuit including a stationary portion and a rotative spider, means for at times rotating said spider at different rates, said stationary portion comprising a pair of pole pieces supported on a shell of magnetic material and provided with spaced apart pole faces, a pair of permanent magnets bridging said spaced apart pole faces, a first and second winding coupled to said pole pieces, a source of coded varying current connected to said first winding, a plurality of relays, a plurality of filters each having a different lower frequency limit with all lower frequency limits being below the frequency of said varying current source for allowing the passage of coded varying current energy developed in said second winding through said polarity of filters, said plurality of relays being connected through said plurality of filters to said second winding, contacts associated with said relays and capable of periodic movement between two extreme positions in response to said coded varying current energy in said second winding, said relays being steadily energized with said contacts being steadily maintained in one of their said two extreme positions when said rotative spider of said magnetic circuit increases rotation causing the frequency of its magnetic circuit varied flux and its second winding developed energy to pass above the different lower frequency limits of said high pass filters.

10. An electric speed governor comprising a magnetic circuit including a stationary portion and a rotative permanent magnet portion, means for rotating said rotative permanent magnet portion at different rates, said rotative permanent magnet portion comprising a permanent magnet positioned between two circular members each provided with spaced apart fingers positioned so that the fingers interlay making adjacent fingers of respective opposite polarities, first and second windings coupled to said stationary portion, a source of coded varying current connected to said first winding, a relay connected to said second winding and capable of following a coded varying voltage developed in said second winding by said source of coded varying current until said rotative permanent magnet portion induces a second winding voltage capable of maintaining said relay steadily energized.

11. An electric speed governor comprising a magnetic circuit including a stationary portion and a rotative permanent magnet portion, means for rotating said rotative permanent magnet portion at different rates, said rotative permanent portion comprising a permanent magnet positioned between two spaced apart discs provided with fingers positioned so that the fingers interlay making adjacent fingers of respective opposite polarities, first and second windings coupled to said stationary portion, a source of coded varying current connected to said first winding, a plurality of relays, a plurality of filters each having a different lower frequency limit with all lower frequency limits being below the frequency of said varying current source for allowing the passage of coded varying current energy developed in said second winding through said plurality of filters, said plurality of relays being connected through said plurality of filters to said second winding, contacts associated with said relays and capable of periodic movement between two extreme positions in response to said coded varying current energy in said second winding, said relay contacts being maintained in one of their said two extreme positions when the rotative permanent magnet portion of said magnetic circuit increases its movement causing the frequency of its magnetic circuit induced flux and its second winding developed energy to pass above the different lower frequency limits of said high pass filters.

12. An electric speed governor comprising a magnetic circuit including a core member and a rotative permanent magnet, means for at times rotating said rotative permanent magnet at different rates, a first winding surrounding said core member, an oscillator source connected to said first winding, a second winding surrounding said core member, a plurality of relays, a plurality of filters each having a different lower frequency limit, one of said plurality of relays being provided with a contact for periodically interrupting the supply of said oscillator source to said first winding, said one of said plurality of relays being connected to the one of said plurality of filters having the highest limit of response, said oscillator source developing a voltage in said second winding of a frequency capable of passing through said plurality of filters and energizing said plurality of relays with said one relay interrupting the oscillator supply causing self-coding, said relays becoming steadily energized as said rotative magnet increases rotation and induces a voltage in said second winding of a frequency greater than the lower limits of the filters, said one of said plurality of relays causing removal of oscillator energy from said first winding as long as said rotative magnet revolves at a speed capable of producing a frequency above the lower limits of said filters.

13. A control device comprising a core member and a cooperating mobavle permanent magnet for forming a magnetic path, means for moving said movable permanent magnet at different rates, an oscillator arranged to produce a coded flux in said core member, a relay, means for intermittently energizing said relay in response to said coded flux in said core member until said movable permanent magnet moves at a speed sufficient to produce a non-coded core member flux for energizing said means and maintaining said relay steadily energized.

14. An electric speed governor comprising a magnetic circuit including a stationary portion and a rotative permanent magnet portion, means for rotating said rotative permanent magnet portion at different rates, said rotative permanent magnet portion comprising a permanent magnet positioned between two circular members each provided with fingers spaced around their periphery and positioned so that the fingers interlay making adjacent fingers of respective opposite polarities, first and second windings coupled to said stationary portion, a source of coded varying current connected to said first winding, a relay having a movable contact, said relay being connected to said second winding, filter means in said relay to second winding connection, said filter means allowing the passage of voltages of a range of frequencies starting at a first selected frequency below and extending to a second selected frequency above the frequency of said source of coded varying current, said relay operating said contact in response to the energy developed in said second winding by said source of coded varying current until said rotative permanent magnet portion reaches a velocity capable of developing a voltage in said second winding of a frequency above said first selected frequency of said filter at which time the relay becomes steadily energized.

15. An electric speed governor comprising a magnetic circuit including a stationary portion and a rotative spider, means for rotating said rotative spider at different rates, said stationary portion comprising a pair of pole pieces supported on a shell of magnetic material and provided with spaced apart pole faces bridged by a pair of permanent magnets, a first and second winding coupled to said pole pieces, a source of coded varying current connected to said first winding, a relay having a movable contact, said relay being connected to said second winding, filter means in said relay to second winding connection, said filter means allowing the passage of voltages of a range of frequencies starting at a first selected frequency below and extending to a second selected frequency above the frequency of said source of coded varying current, said relay periodically operating said contact in response to the coded voltage developed in said second winding by said source of coded varying current until said rotative spider reaches a velocity capable of developing a voltage in said second winding of a frequency above the first selected frequency of said filter at which time the relay becomes steadily energized.

16. An electric speed governor comprising a magnetic circuit including a stationary portion and a rotative permanent magnet, means for at times rotating said rotative permanent magnet at different rates, a first and a second winding coupled to said magnetic circuit, a source of coded varying current connected to said first winding, a relay provided with movable contacts, said relay being connected to said second winding, filter means in said relay to second winding connection, said filter means allowing the passage of voltages of a range of frequencies starting at a first selected frequency below and extending to a second selected frequency above the frequency of said source of coded varying current, said relay periodically operating its contacts in response to a voltage developed in said second winding by said source of coded varying current until said rotative permanent magnet reaches a velocity capable of developing a voltage in said second winding of a frequency above said first selected frequency at which time the relay becomes steadily energized.

17. An electric speed governor comprising a winding surrounding a magnetic circuit including a magnetized movable portion which when moved results in the generation in said winding of a voltage having a frequency proportional to the rate of movement of said movable portion, relay means connected to said winding to be steadily energized when the frequency of the voltage generated in said winding is above a predetermined value, and means controlled by said relay means and effective when said relay means is not steadily energized for supplying to said winding a periodically interrupted voltage which causes said relay to become periodically energized.

18. An electric speed governor comprising a winding surrounding a magnetic circuit including a magnetized movable portion which when moved results in the generation in said winding of a voltage having a frequency proportional to the speed of rotation of said movable portion, a source of varying current means for at times periodically energizing said winding with a voltage developed by said source of varying current, and relay means selectively responsive to the voltages developed in said winding.

References Cited in the file of this patent

UNITED STATES PATENTS

| | | |
|---|---|---|
| 2,255,092 | Wintsch | Sept. 9, 1941 |
| 2,502,119 | Bauersfeld | Mar. 28, 1950 |